(12) United States Patent
Delfosse et al.

(10) Patent No.: US 11,421,730 B2
(45) Date of Patent: Aug. 23, 2022

(54) DEVICE FORMING AN AERODYNAMIC RADIAL BEARING WITH SHEETS AND METHOD FOR MANUFACTURING SUCH A DEVICE

(71) Applicant: LIEBHERR-AEROSPACE TOULOUSE SAS, Toulouse (FR)

(72) Inventors: Frédéric Delfosse, Toulouse (FR); Grégory Grau, Toulouse (FR)

(73) Assignee: LIEBHERR-AEROSPACE TOULOUSE SAS, Toulouse (FR)

(*) Notice: Subject to any disclaimer, the term of this patent is extended or adjusted under 35 U.S.C. 154(b) by 0 days.

(21) Appl. No.: 17/256,643

(22) PCT Filed: Jun. 27, 2019

(86) PCT No.: PCT/FR2019/051587
§ 371 (c)(1),
(2) Date: Dec. 28, 2020

(87) PCT Pub. No.: WO2020/008127
PCT Pub. Date: Jan. 9, 2020

(65) Prior Publication Data
US 2021/0262525 A1 Aug. 26, 2021

(30) Foreign Application Priority Data

Jul. 2, 2018 (FR) ...................................... 1856097

(51) Int. Cl.
*F16C 17/02* (2006.01)
*F16C 43/02* (2006.01)
(52) U.S. Cl.
CPC ............ *F16C 17/024* (2013.01); *F16C 43/02* (2013.01); *F16C 2360/24* (2013.01)
(58) Field of Classification Search
CPC ..... F16C 17/024; F16C 43/02; F16C 2360/24
See application file for complete search history.

(56) References Cited

U.S. PATENT DOCUMENTS

| 5,911,510 A | 6/1999 | Saville |
| 7,553,086 B2 * | 6/2009 | Kang .................... F16C 17/024 |
| | | 384/103 |

(Continued)

FOREIGN PATENT DOCUMENTS

| JP | S57109322 | 7/1982 | |
| KR | 1629714 B1 * | 6/2016 | ............ F16C 17/024 |
| KR | 101808008 B1 * | 12/2017 | |

OTHER PUBLICATIONS

Machine Translation of KR-101808008-B1 (Year: 2017).*
Machine Translation of KR-1629714-B1 (Year: 2016).*

*Primary Examiner* — Alan B Waits
(74) *Attorney, Agent, or Firm* — CRGO Global; Steven M. Greenberg

(57) ABSTRACT

The invention relates to a device forming a foil air bearing, comprising a cylindrical sleeve (10) extending along a longitudinal direction, and having an inner surface (11) which defines a central bore, characterized in that it further comprises: at least one longitudinal notch (40, 50, 60) formed in said cylindrical sleeve and opening radially into said central bore; a first peripheral inner lining, called the bump lining, comprising at least one metal foil equipped with radial projections, called the bump foil (22, 23, 24), each bump foil having, at each end, a radial tongue, called the radial bump tongue (22*a*, 22*b*, 23*a*, 23*b*, 24*a*, 24*b*), housed freely in a longitudinal notch (40, 50, 60); a second peripheral inner lining, called the top lining, comprising at least one metal foil, called the top foil (32, 33, 34), each top foil having, at each end, a radial tongue, called the radial top tongue (32*a*, 32*b*, 33*a*, 33*b*, 34*a*, 34*b*), housed freely in a longitudinal notch (40, 50, 60).

11 Claims, 4 Drawing Sheets

(56) References Cited

U.S. PATENT DOCUMENTS

Figure 1:
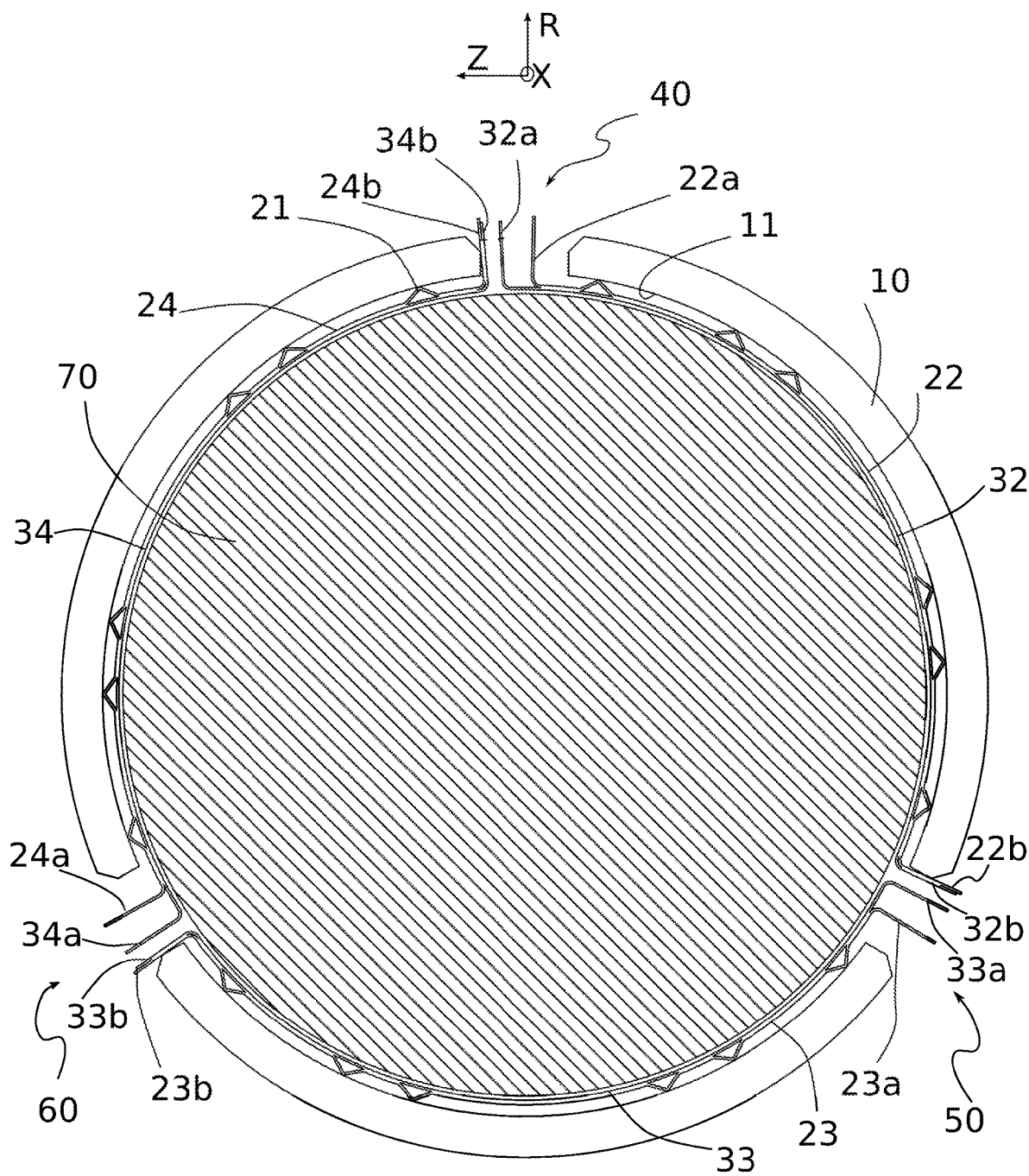

2005/0163407 A1  7/2005  Kang et al.
2006/0018574 A1  1/2006  Kang et al.
2017/0097039 A1* 4/2017  Kim ........................ F16C 27/02

* cited by examiner

DEVICE FORMING AN AERODYNAMIC RADIAL BEARING WITH SHEETS AND METHOD FOR MANUFACTURING SUCH A DEVICE

CROSS-REFERENCE TO RELATED APPLICATIONS

This application is a § 371 national phase entry of International Application No. PCT/FR2019/051587, filed Jun. 27, 2019, which claims priority to French Patent Application No. 1856097, filed Jul. 2, 2018.

1. TECHNICAL FIELD OF THE INVENTION

The technical field of the invention is that of air bearings, also referred to as aerodynamic bearings. The invention relates more particularly to foil bearings for a turbine engine and extends to turbine engines equipped with such foil bearings. The invention also relates to a method for manufacturing such a foil bearing.

2. TECHNOLOGICAL BACKGROUND

A foil bearing is a bearing formed from a plurality of foils, which are generally metal foils and which make it possible to support a shaft of a rotating machine such as a turbine engine. A foil bearing is generally formed by at least one upper foil, which is commonly referred to as a "top foil" and which faces the rotating shaft, and at least one corrugated foil, which is commonly referred to as a "bump foil" and which is arranged under the top foil and acts as a stiffener and a shock absorber. The assembly formed by the top foil and the bump foil is mounted on a casing or sleeve. In the following, the term "sleeve" denotes the part which receives the foil bearing, it being understood that this part can also be a casing, in which case the bearing is mounted in the casing of the machine.

There are different technical solutions for fixing and maintaining a foil bearing in a sleeve (or casing) which fall under either removable systems, i.e. the bearing formed by the top foil and the bump foil is slipped into a notch formed in the sleeve and can therefore be removed therefrom, or non-removable systems, i.e. the bearing formed by the top foil and the bump foil is welded to the sleeve, and therefore cannot be separated from the sleeve once it is fixed to the latter.

For example, application EP0490443 discloses such a non-removable foil bearing and applications EP0601624 and FR2700821 disclose removable foil bearings comprising foil tongues which are force-fittingly mounted in the sleeve.

Whatever the proposed solutions, whether removable or not, these known solutions generally limit the use of the bearing to one preferred direction of rotation. Indeed, whatever the method of fixing the bearing to the sleeve, one end of the assembly formed by the top foil and the bump foil is fixed to the sleeve and the other end is left free, so as to allow the formation the radial play which is necessary for the rotation of the shaft once the latter is housed in the bearing.

It is therefore necessary for the shaft to rotate in such a way that it pushes the free end of the top foil toward the fixed end. Indeed, otherwise, the shaft would carry the free end of the foil with it, which would then close on the shaft and cause a clamping phenomenon, blocking the operation of the bearing.

It is therefore necessary, with most current solutions, to equip the bearings with fool-proofing means, that is to say with means making it possible to avoid mounting errors of the shaft in the bearing, according to the preferred direction of operation of the bearing.

There are also some solutions which make it possible to form a bidirectional foil bearing. For example, patent application US2002054718 discloses such a bidirectional bearing which therefore does not require the presence of fool-proofing means. This specific solution implements a plurality of bump foils and a plurality of top foils fixed to the inner periphery of the sleeve so as to form a plurality of sectors each formed by a top foil and a bump foil.

In the case of removable systems, the operations of machining specific notches to receive and hold the foils are complex and costly. Indeed, these operations generally require machining by electro-erosion, which therefore requires specific tools and/or the use of skilled external partners.

The inventors have therefore sought to develop a new device forming a foil bearing which can operate in both directions of rotation, while being able to be implemented with conventional non-specific bump foils.

The inventors have also sought to develop a solution which can be implemented without particular difficulties and without requiring the use of complex and expensive techniques.

3. AIMS OF THE INVENTION

The invention aims to provide a device forming a foil air bearing which addresses at least some of the drawbacks of the known bearings.

The invention aims in particular to provide, in at least one embodiment, a foil air bearing device which does not require the presence of fool-proofing means, that is to say which can be mounted in either direction.

The invention also aims to provide, in at least one embodiment, such a device which does not require complex machining operations during its manufacture.

The invention also aims to provide a method of manufacturing a foil air bearing according to the invention.

The invention aims in particular to provide, in at least one embodiment of the invention, such a manufacturing method which can be implemented simply, without using complex and/or expensive manufacturing techniques.

4. DISCLOSURE OF THE INVENTION

To do this, the invention relates to a device forming a foil air bearing, comprising a cylindrical sleeve extending along a direction, called the longitudinal direction, and having an inner surface which defines a central bore.

A device according to the invention is characterized in that it further comprises:
- at least one longitudinal notch formed in said cylindrical sleeve and opening radially into said central bore through an opening,
- a first peripheral inner lining, called the bump lining, comprising at least one metal foil equipped with radial projections, called the bump foil, said bump lining forming a main curve housed in said central bore, carrying said projections arranged opposite said inner surface of said cylindrical sleeve to form an elastically deformable lining, each bump foil having, at each end, a radial tongue, called the radial bump tongue, freely housed in a longitudinal notch, a second peripheral inner lining, called the top lining, comprising at least one metal foil, called the top foil, said top lining forming a main curve housed in said central bore and arranged opposite said main curve of said bump lining to define an enclosure for receiving a shaft of a rotating machine, each top foil having, at each end, a radial tongue, called the radial top tongue, freely housed in a longitudinal notch.

A device according to the invention is therefore formed by a cylindrical sleeve which receives said bump lining and said top lining. The sleeve comprises at least one longitudinal notch which can be obtained by a conventional machining process, such as drilling. This longitudinal notch opens into the central bore for receiving the linings through an opening. Also, the radial ends of the foils of the linings housed in the central bore can be inserted freely into a longitudinal notch, by passing through the opening of this notch.

One of the specific features of a device according to the invention is therefore the free mounting of the radial tongues of the foils of the bump and top linings in a longitudinal notch.

Free mounting of the radial tongues in the longitudinal notches means that the tongues are not secured to the sleeve and can therefore move freely inside the notches according to the external stresses which result in particular from the rotation of the shaft, when the latter is housed in the foil bearing according to the invention. In addition, with the tongues being freely housed in the notches, they come into abutment against a wall of the longitudinal notch when the shaft housed in the bearing turns in a first direction of rotation, and move in the azimuthal direction toward the center of the notch when the shaft rotates in the opposite direction of rotation. Mounting the foils in the notches consists only in arranging the radial tongues in the notches, without requiring the foils to be secured in the notches of the sleeve. The radial tongues are not fixed to the sleeve, nor constrainedly mounted in the notches of the sleeve.

This free mounting not only makes it possible to facilitate the manufacturing operations of the foil bearing and the mounting operations of the bearing, but also makes it possible to operate the bearing in both directions of rotation. Indeed, the foils of the bump and top linings are blocked on one side of the longitudinal notch and free on the opposite side when the shaft housed in the bearing rotates in a first direction of rotation. When the shaft rotates in the opposite direction, the tongues move freely in the notch in an azimuthal direction so that the radial tongues which were previously free are now blocked against the walls of the longitudinal notch, and the radial tongues which were previously blocked against the opposite wall of the notch are now free in the notch.

A device forming a bearing according to the invention therefore combines the advantages of simplified manufacture and bidirectional operation.

The blocking of the foils against the walls of the notch results from the specific geometry of the foils and the longitudinal notch.

Advantageously and according to the invention, said longitudinal notch further comprises, on either side of said opening, an azimuthal clearance and a surface for connecting to said inner surface of said cylindrical sleeve that comprises at least one longitudinal segment which is arranged between said azimuthal clearance and said opening, forming a point-like azimuthal stop of said radial tongue of a bump foil housed in this notch, the free end of said radial tongue extending into said opposite azimuthal clearance.

This advantageous variant makes it possible to form a point-like contact line between the radial tongues and the walls of the longitudinal notch. Furthermore, the radial tongue extends in an azimuthal clearance such that the radial tongue makes mechanical contact with the contact line of the longitudinal notch at a non-end section of the tongue. Indeed, the radial end of the radial tongue extends in the azimuthal clearance and is therefore not in contact with the walls of the longitudinal notch. This makes it possible to ensure that the radial tongue will not slide on the wall of the notch, nor become blocked in the notch.

According to this advantageous variant, the longitudinal notch comprises an azimuthal clearance and a contact segment on each side of the notch.

Preferably and according to the invention, the device has a longitudinal plane of symmetry. This plane of symmetry advantageously passes through the center of the longitudinal notches formed in the cylindrical sleeve.

This symmetry makes it possible in particular to form a device which does not require fool-proofing means. Such a bearing can thus operate in both directions of rotation, without any preferred direction of rotation.

Advantageously and according to the invention, each longitudinal notch has a width Le which is less, by a proportionality factor k1, than the distance Dbump separating the projections of the bump lining arranged on the main curve on either side of this longitudinal notch and which is greater, by a proportionality factor k2, than the sum of the thicknesses of the radial tongues of the top and bump foils housed in this notch, when a shaft of a rotating machine is inserted into said receiving enclosure delimited by said top foil.

In other words and according to this variant of the invention, the width Le of a notch is linked to the distance Dbump separating the projections of the bump lining and to the thicknesses EPL of the radial tongues housed in the notch by the following relationship:

$$k2 \cdot \Sigma EPL < Le < k1 \cdot Dbump$$

This inequality makes it possible to ensure that the projections (or bulges) of the bump lining which are arranged on either side of a notch do not fall into the longitudinal notch.

Advantageously and according to the invention, the proportionality factor k1 is equal to or less than 0.8 and the proportionality factor k2 is greater than or equal to 1.2.

Advantageously and according to the invention, for at least one longitudinal notch, the distance d3 separating the radial top tongues housed in this notch is less than their thickness by a proportionality factor k3 and greater than their thickness by a proportionality factor k4, when a shaft of a rotating machine is inserted into said receiving enclosure delimited by said top foil.

In other words and according to this variant of the invention, the distance d3 separating the radial top tongues is linked to the thickness of a radial top tongue ELRS by the following relationship:

$$k4 \cdot ELRS < d3 < k3 \cdot ELRS$$

This inequality makes it possible to guarantee that the shaft of the rotating machine which is intended to be carried by the bearing according to the invention can be freely housed there.

Advantageously and according to the invention, said proportionality factor k3 is greater than or equal to 8 and the proportionality factor k4 is less than or equal to 3.

Advantageously and according to the invention, for at least one longitudinal notch, the distance d1 separating a radial top tongue housed in this notch and a radial bump tongue housed in this notch is less than the thickness of the radial top tongue housed in this notch by a proportionality factor k5 and greater than the thickness of the radial top tongue housed in this notch by a proportionality factor k6, when a shaft of a rotating machine is inserted into said receiving enclosure delimited by said top foil.

In other words and according to this variant of the invention, the distance d1 separating a radial top tongue housed in a notch and the radial bump tongue of this notched is linked to the thickness of a radial top tongue ELRS by the following relationship:

$$k6 \cdot ELRS < d1 < k5 \cdot ELRS$$

This inequality makes it possible to ensure that the bump lining does not constrain the top lining.

Advantageously and according to the invention, said proportionality factor k5 is greater than or equal to 8 and the proportionality factor k6 is less than or equal to 3.

Advantageously and according to the invention, the device has radial play, when a shaft of a rotating machine is inserted into said receiving enclosure delimited by said top lining, which radial play is greater than the thickness of a top foil by a proportionality factor k7 and less than the thickness of a top foil by a proportionality factor k8.

In other words and according to this variant of the invention, the radial play jr is linked to the thickness of a top foil ELS by the following relationship:

$$k7 \cdot ELS < jr < k8 \cdot ELS$$

Advantageously and according to the invention, said proportionality factor k7 is equal to 0 and said proportionality factor k8 is less than 2, and in particular between 0.5 and 1.8.

The proportionality factors used depend in particular on the diameter of the shaft of the rotating machine inserted into the bearing and on the rotating machine in question.

Advantageously and according to the invention, at least one bump foil comprises a smooth metal foil, called the support foil, and a plurality of metal foils equipped with projections which are secured to said support foil.

Advantageously and according to the invention, the device comprises a single longitudinal notch, a bump lining formed from a single bump foil, and a top lining formed from a single top foil, so that the radial tongues of the top and bump foils are all freely housed in the same notch.

According to other variants, the bump lining can comprise N bump foils and the top lining can comprise M top foils. In general, different configurations are possible depending on the number of longitudinal notches, with the sole constraint that the number of bump foils must be greater than or equal to the number of top foils. In other words, N must be greater than or equal to M, since the top foils cover the bump foils and the radial tongues of the top and bump foils are housed freely in longitudinal notches.

Advantageously and according to the invention, the device comprises at least one means for axially locking said bump and top linings.

Such a locking means is for example an elastic ring of the circlip type, the ends of which are received in a safety catch formed in the sleeve. Such an elastic ring advantageously has an internal diameter slightly larger than the internal diameter of the sleeve so that the ring does not create a restriction of the passage of air or gas under the foils of the bearing.

The invention also relates to a method for manufacturing a device forming a foil air bearing comprising the steps of:

machining a central bore extending along a direction, called the longitudinal direction, in a cylindrical sleeve, said central bore being delimited by an inner surface, machining at least one longitudinal notch in said cylindrical sleeve, which notch opens radially into said central bore, providing a connection surface between said longitudinal notch and the inner surface of said sleeve, forming a first peripheral inner lining, called the bump lining, from at least one metal foil equipped with radial projections, called the bump foil, and having, at each end, a radial tongue, called the radial bump tongue, said bump lining forming a main curve carrying said projections arranged opposite said inner surface of said cylindrical sleeve to form an elastically deformable lining, freely housing each radial bump tongue in a longitudinal notch, forming a second peripheral inner lining, called the top lining, from at least one metal foil, called the top foil, said top lining forming a main curve arranged opposite said main curve of said bump lining to define an enclosure for receiving a shaft of a rotating machine, each top foil having, at each end, a radial tongue, called the radial top tongue, freely housing each radial top tongue in a longitudinal notch.

The advantages of a device forming a foil air bearing according to the invention apply mutatis mutandis to a manufacturing method according to the invention.

Advantageously and according to the invention, the step consisting in machining at least one longitudinal notch in said cylindrical sleeve which opens radially into said central bore further comprises the step consisting in machining, on either side of said opening, an azimuthal clearance and a surface for connecting to said inner surface of said cylindrical sleeve that comprises at least one longitudinal segment arranged between said azimuthal clearance and said opening, forming a point-like azimuthal stop of said radial tongue of a bump foil housed in this notch, the free end of said radial tongue extending into said azimuthal clearance.

The invention also relates to a device forming a radial bearing and a method for manufacturing a device of this kind, characterized in combination by all or some of the features mentioned above or below.

5. LIST OF FIGURES

Figure 2:
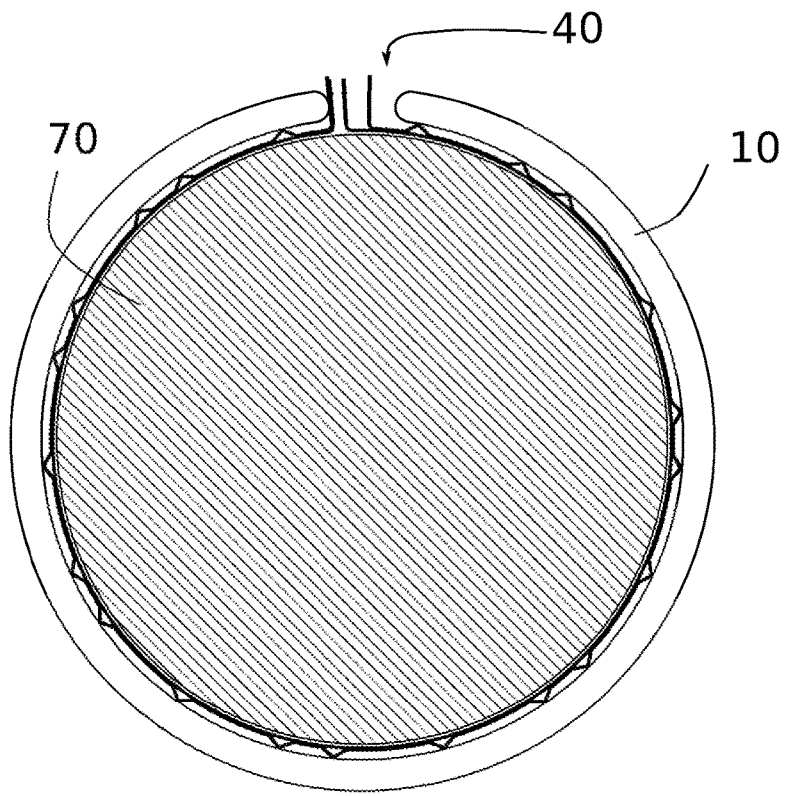
Figure 3:
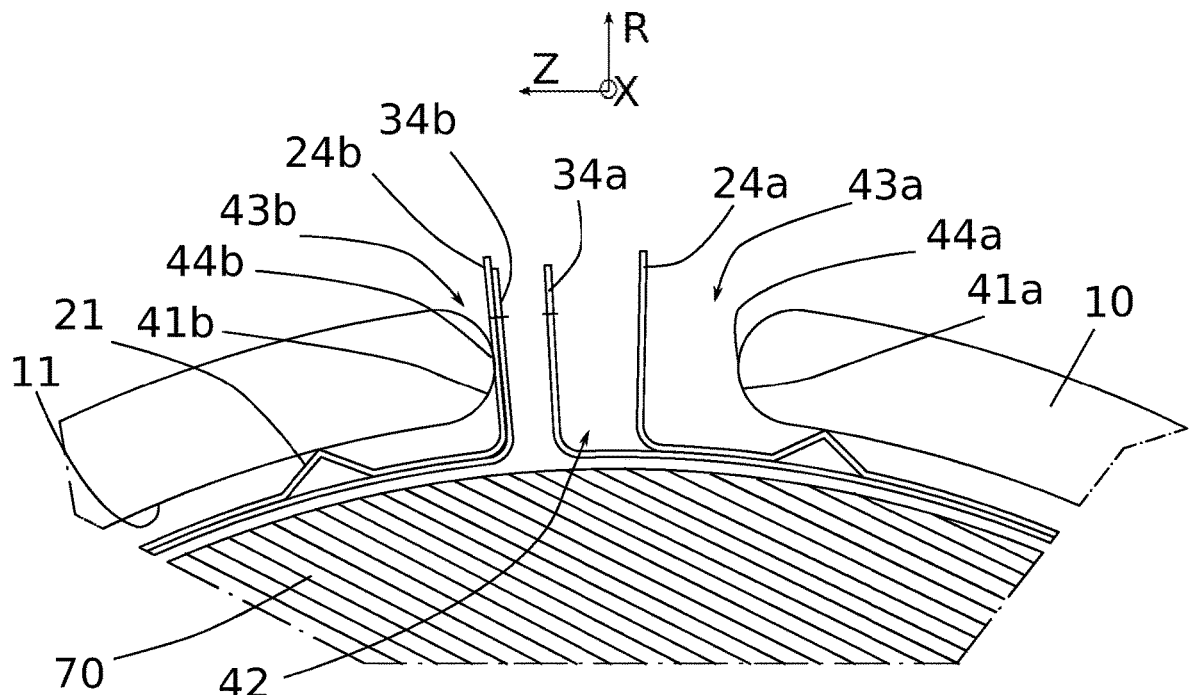
Figure 4:
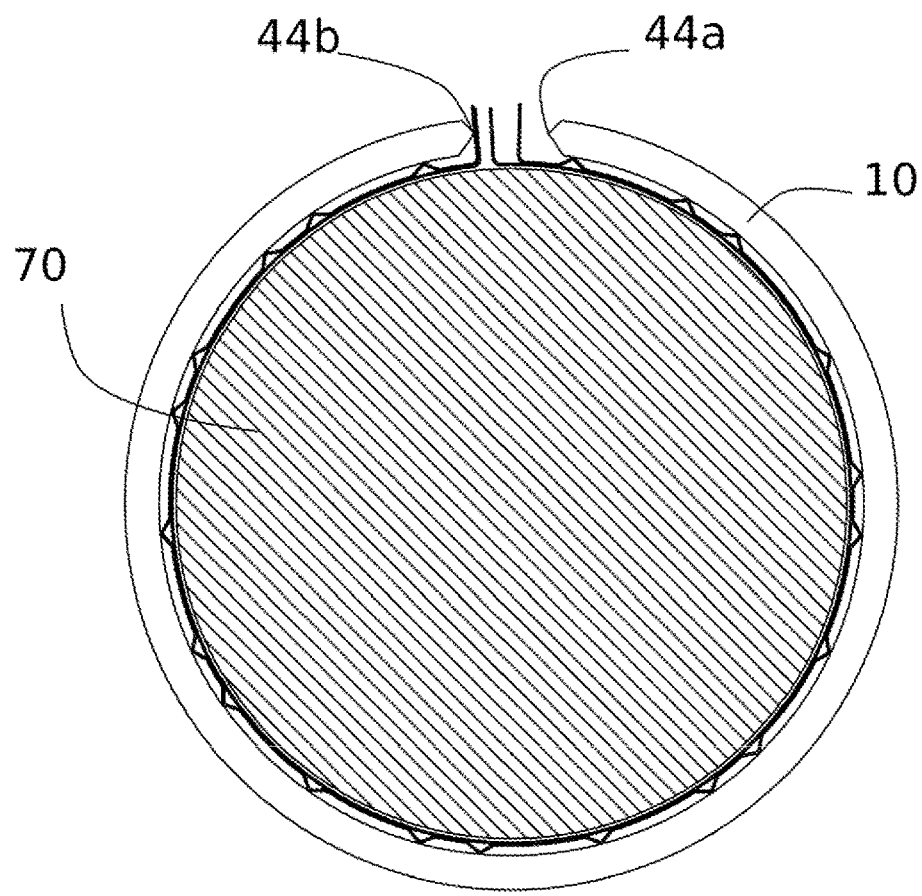
Figure 5:
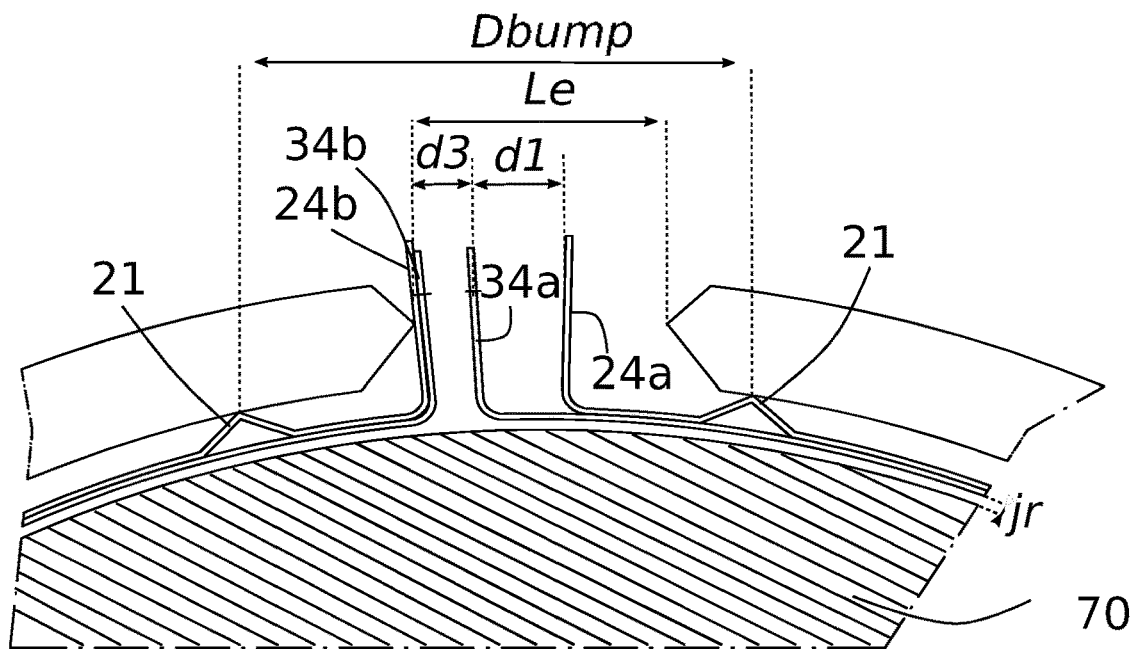
Figure 6:
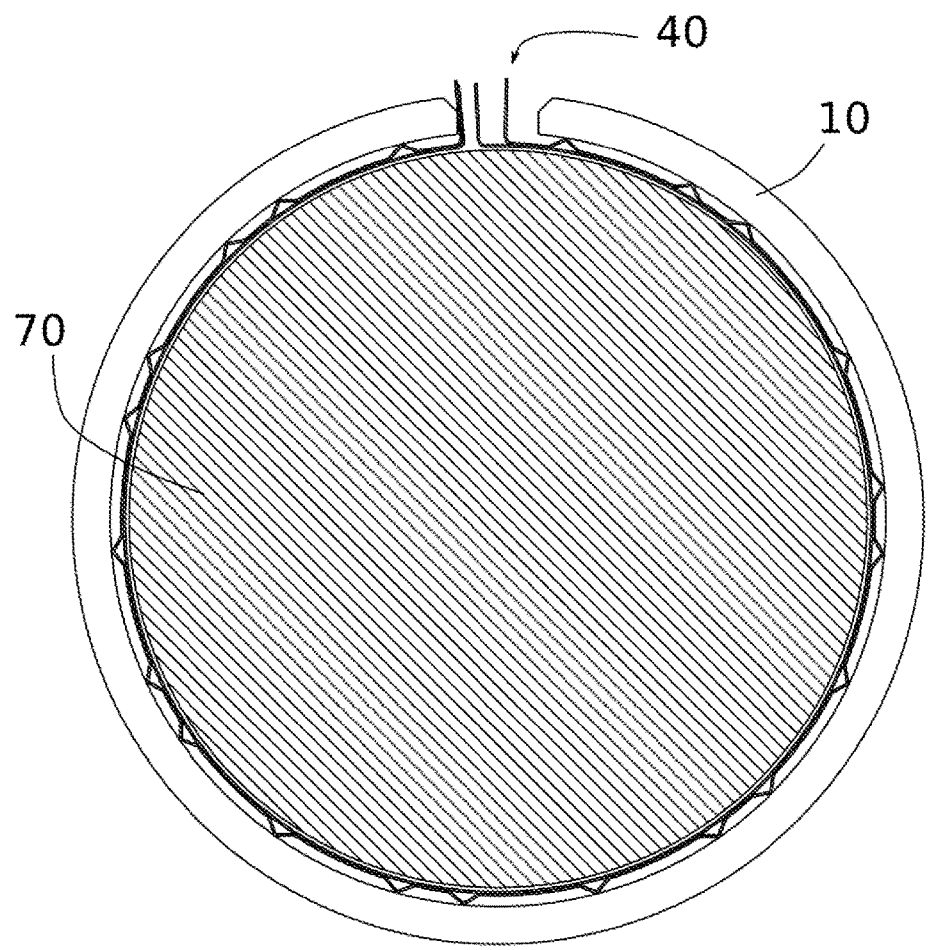
Figure 7:
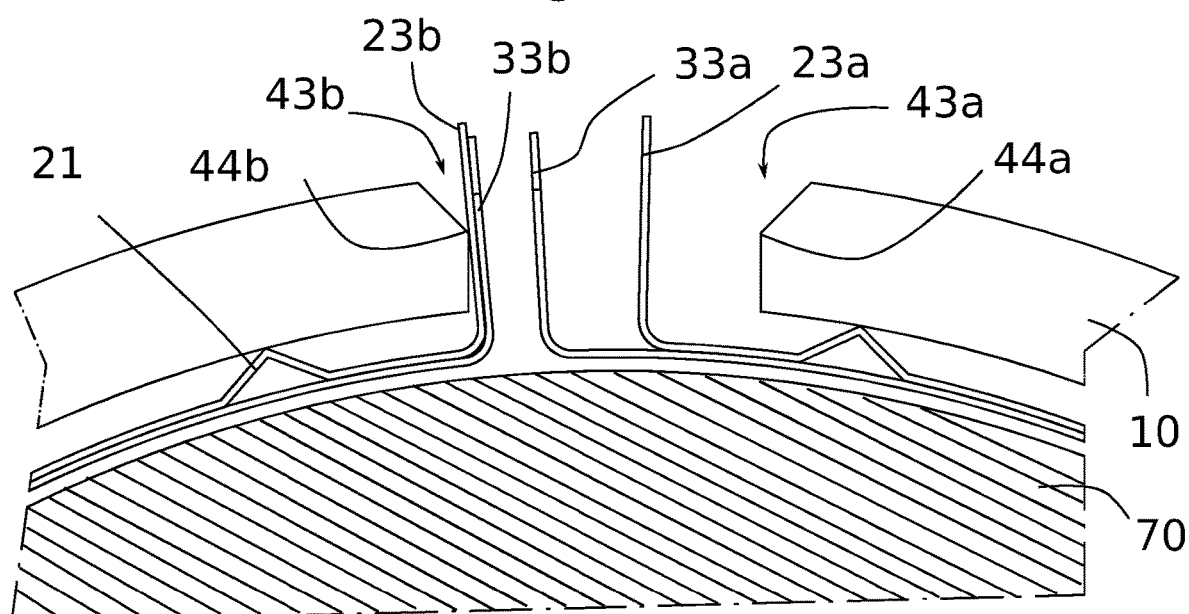

Further aims, features and advantages of the invention will become apparent upon reading the following description, which is provided solely by way of non-limiting example, and which refers to the appended figures, in which:

FIG. 1 is a schematic sectional view of a device forming a foil air bearing according to one embodiment of the invention, FIG. 2 is a schematic sectional view of a device forming a foil air bearing according to another embodiment of the invention, FIG. 3 is a detailed schematic view of the notch of the device of FIG. 2, FIG. 4 is a schematic sectional view of a device forming a foil air bearing according to another embodiment of the invention, FIG. 5 is a detailed schematic view of the notch of the device of FIG. 4, FIG. 6 is a schematic sectional view of a device forming a foil air bearing according to another embodiment of the invention, FIG. 7 is a detailed schematic view of the notch of the device of FIG. 6.

6. DETAILED DESCRIPTION OF AN EMBODIMENT OF THE INVENTION

For the sake of illustration and clarity, the scales and proportions are not strictly adhered to in the figures. Throughout the detailed description which follows with reference to the figures, unless otherwise indicated, each element of the bearing is described as it is arranged when a shaft of a turbine engine is housed in the bearing which extends in a main direction, called the longitudinal direction. The terms "longitudinal" or "axial" are used in connection with this main direction of the bearing, referenced by X in the figures. The term "radial" is used in reference to this main axis. The azimuthal direction Z is the direction orthogonal to both the radial direction R and the longitudinal direction X. In other words, the longitudinal direction X, the radial direction R and the azimuthal direction Z correspond respectively to the directions defined by the altitude, the radius and the angle in a cylindrical coordinate system.

FIG. 1 is a schematic view of a bearing according to a first embodiment of the invention which carries a shaft 70 of a rotating machine, which can be of any type.

In the sectional views of FIGS. 1 to 7 and for the purpose of simplifying these figures, only the shaft 70 is cross-hatched so as to illustrate the fact that the shaft is shown in cross section, it being understood that the other elements shown in the figures (sleeve, bump lining and top lining in particular) are also shown in cross section.

This bearing comprises a cylindrical sleeve 10 which has an inner surface 11 which defines a bore for receiving a bump lining (shown in FIG. 1 by the bump foils 22, 23, 24 described below) and a top lining (shown in FIG. 1 by the top foils 32, 33, 34 described below).

The cylindrical sleeve 10 further comprises three longitudinal notches 40, 50, 60 which are distributed over the sleeve 10.

The bump lining of the bearing of FIG. 1 comprises three metal bump foils 22, 23, 24. Each metal bump foil is provided with radial projections 21 which are oriented toward the inner surface 11 of the cylindrical sleeve 10 so as to together form an elastically deformable lining. According to other embodiments, the projections can be oriented toward the top lining. In the figures, only one projection is referenced for the sake of clarity. The number of projections 21 and their shape can be of any type.

Each bump foil 22, 23, 24 is formed by a metal foil curved so that this curve matches the shape of the inner surface 11 of the sleeve 10 and has radial tongues at each of these two ends, which tongues are respectively referenced 22a, 22b, 23a, 23b, 24a, 24b. The radial tongues form a predetermined angle with the curve of the bump foil so that the tongues can extend radially as the curve follows the curvature of the inner surface 11 of the sleeve 10. This angle of the tongues with respect to the curve of the foil is for example in the range of 95°. Other angle values can be used, in particular angles between 90° and 110°.

The radial tongues 22a, 22b, 23a, 23b, 24a, 24b of the bump foils 22, 23, 24 are housed freely in the longitudinal notches 40, 50, 60.

More particularly, the bump foil 22 has a first radial tongue 22a which is housed freely in the notch 40 and a second radial tongue 22b which is housed freely in the notch 50.

The bump foil 23 has a first radial tongue 23a which is housed freely in the notch 50 and a second radial tongue 23b which is housed freely in the notch 60. The bump foil 24 has a first radial tongue 24a which is housed freely in the notch 60 and a second radial tongue 24b which is housed freely in the notch 40.

The top lining is also formed from three metal foils 32, 33, 34. It should be noted that according to other embodiments, the top lining may be formed from a single metal foil or from two foils if the bump lining is formed from three bump foils. The only production constraint is that the number of top foils must be less than or equal to the number of bump foils and that the number of bump foils must be less than or equal to the number of longitudinal notches formed in the sleeve 10.

Each top foil 32, 33, 34 is formed by a metal foil which is curved so that this curve matches the shape of the curve of the opposite bump foil, which in turn matches the shape of the inner surface 11 of the sleeve 10. Each top foil has radial tongues at each of these two ends, which tongues are respectively referenced 32a, 32b, 33a, 33b, 34a, 34b. The radial tongues form a predetermined angle with the curve of the top foil so that the tongues can extend radially as the curve follows the curvature of the curve of the opposite bump foil. This angle of the tongues with respect to the curve of the foil is for example in the range of 95°. Other angle values can be used, in particular angles between 90° and 110°.

The radial tongues 32a, 32b, 33a, 33b, 34a, 34b of the top foils 32, 33, 34 are housed freely in the longitudinal notches 40, 50, 60.

More particularly, the top foil 32 has a first radial tongue 32a which is housed freely in the notch 40 and a second radial tongue 32b which is housed freely in the notch 50.

The bump foil 33 has a first radial tongue 33a which is housed freely in the notch 50 and a second radial tongue 33b which is housed freely in the notch 60.

The bump foil 34 has a first radial tongue 34a which is housed freely in the notch 60 and a second radial tongue 34b which is housed freely in the notch 40.

FIGS. 2 to 7 illustrate other embodiments of the invention in which the lining has only a single longitudinal notch.

In the following and in connection with FIGS. 2 to 7, the same references are used as those used in connection with the longitudinal notch 40 of FIG. 1 so as to facilitate understanding, it being understood that these are different embodiments from that of FIG. 1. Furthermore, in the embodiment of FIGS. 2 to 7, the bump lining is formed from a single bump foil 24 and the top lining 30 is formed from a single top foil 34.

The main difference between the embodiments of FIGS. 2, 4 and 6 is the shape of the connection surfaces 41a, 41b of the longitudinal notch 40.

In particular, the longitudinal notch 40 comprises, on either side of its opening 42, an azimuthal clearance 43a, 43b and a surface 41a, 41b for connecting to the inner surface 11 of the cylindrical sleeve 10.

This longitudinal notch 40 is preferably symmetrical with respect to a longitudinal plane. Furthermore, each connection surface 41a, 41b is configured such that it forms a longitudinal segment 44a, 44b which is arranged between the azimuthal clearance 43a, 43b and the opening 42 to form a point-like azimuthal stop of the radial tongue of a bump foil housed in the notch 40. A point-like azimuthal stop is a stop which prevents the radial tongues from moving in the azimuthal direction, that is to say in a direction which is perpendicular to the longitudinal direction and to the radial direction. In addition, this longitudinal azimuthal stop is point-like, that is to say it is located on a longitudinal axis of the connection surface. When the radial tongues are housed in the notch 40, the ends of the tongues can freely extend into the azimuthal clearance.

Thus, according to the embodiment shown in FIGS. 2, 4 and 6, and their details in FIGS. 3, 5 and 7, the radial tongue 24*b* abuts azimuthally against the segment 44*b* of the connection surface 41*b*.

Of course, when the shaft turns in the other direction of rotation, it is the radial tongue 24*a* of the bump foil which abuts azimuthally against the segment 44*a* of the connection surface 41*a* of the longitudinal notch 40.

In FIGS. 2 and 3, the connection surface is rounded so that the segment 44*a*, 44*b* forming a point-like azimuthal stop is a generatrix of the rounded surface forming the connection surface.

In FIGS. 4, 5, 6 and 7, the segments 44*a*, 44*b* forming a point-like azimuthal stop are ridges. Each ridge can be formed by two surfaces forming an angle α between them in the range of 90°, like in FIGS. 4 and 5, or in the range of 120°, like in FIGS. 6 and 7. Of course, other angles are possible, without this calling the object of the invention into question.

According to the embodiment of the figures (and as shown more precisely in FIG. 5), the longitudinal notch 40 has a width Le which is less, by a proportionality factor k1 (which is for example set at 0.8), than the distance Dbump which separates the projections 21 of the bump lining, and greater, by a proportionality factor k2 (which is for example set at 1.2), than the sum of the thicknesses of the radial tongues of the top and bump foils housed in the notch 40.

In addition, and according to the embodiment of the figures, the distance d3 which separates the radial top tongues 34*a*, 34*b* housed in the notch 40 is less than their thickness by a proportionality factor k3 (which is for example set at 8), and greater than their thickness by a proportionality factor k4 (which is for example set at 3).

In addition and according to the embodiment of the figures, the distance d1 which separates a radial top tongue 34*a* housed in the notch 40 and a radial bump tongue 24*a* housed in this notch is less, by a proportionality factor k5 (which is for example set at 8), than the thickness of the radial top tongue 34*a* housed in the notch 40, and greater, by a proportionality factor k6 (which is for example set at 3), than the thickness of the radial top tongue 34*a* housed in this notch 40.

Finally, the device according to the invention advantageously comprises a radial play jr, which is greater, by a proportionality factor k7 (which is for example set at 0), than the thickness of a top foil, and less, by a proportionality factor k8 (which is for example set at 1.5, than the thickness of a top foil.

In other words, and as shown in FIG. 5, the radial play, once the shaft 70 is housed in the bearing of the invention, is preferably between 0 and one and a half times the thickness of the top foil.

This radial play between the shaft 70 and the foils results from the chain of dimensions taking into account the diameter of the shaft 70, the internal diameter of the sleeve 10, the height of the projections 21 of the bump foils and the thickness of the foils.

The invention claimed is:

1. A device forming a foil air bearing, comprising a cylindrical sleeve extending along a longitudinal direction, and having an inner surface which defines a central bore, the device comprising:
    at least one longitudinal notch formed in said cylindrical sleeve and opening radially into said central bore through an opening,
    a bump lining, comprising a metal foil equipped with radial projections, said bump lining forming a main curve housed in said central bore and carrying said projections arranged opposite said inner surface of said cylindrical sleeve to form an elastically deformable lining, each bump foil having, at each end, a radial bump tongue freely housed in the longitudinal notch,
    a top lining, housed in said central bore and comprising at least one metal top foil, said top lining forming a main curve housed in said central bore and arranged opposite said main curve of said bump lining to define an enclosure for receiving a shaft of a rotating machine, each top lining having, at each end, a radial top tongue freely housed in the longitudinal notch;
    wherein the at least one longitudinal notch further comprises, on either side of said opening, an azimuthal clearance and a surface for connecting to said inner surface of said cylindrical sleeve that comprises at least one longitudinal segment which is arranged between said azimuthal clearance and said opening, forming a point-like azimuthal stop for said radial tongue of a bump foil housed in this notch, the free end of said radial tongue extending into said azimuthal clearance.

2. The device according to claim 1 wherein each longitudinal notch has a width which is less, by a proportionality factor, than a distance separating the projections of the bump lining arranged on the main curve on either side of this longitudinal notch and the width is greater, by a second proportionality factor, than a sum of the thicknesses of the radial tongues of the top foils and bump foils housed in this notch, when a shaft of a rotating machine is inserted into said receiving enclosure delimited by said top foil.

3. The device according to claim 2, wherein the first proportionality factor is equal to or less than 0.8 and the second proportionality factor is greater than or equal to 1.2.

4. The device according to claim 1 wherein, for at least one longitudinal notch, a distance separating the radial top tongues housed in said notch is less than the thickness of one radial top tongue by a first proportionality factor and greater than the thickness of one radial top tongue by a second proportionality factor, when a shaft of a rotating machine is inserted into said receiving enclosure delimited by said top foil.

5. The device according to claim 4, wherein said first proportionality factor is greater than or equal to 8 and the second proportionality factor is less than or equal to 3.

6. The device according to claim 1 wherein, for at least one longitudinal notch, a distance separating a radial top tongue housed in said notch and a radial bump tongue housed in said notch is less than the thickness of the radial top tongue housed in this said notch by a first proportionality factor and greater than the thickness of the radial top tongue housed in said notch by a second proportionality factor, when the shaft of a rotating machine is inserted into said receiving enclosure delimited by said top foil.

7. The device according to claim 6, wherein said first proportionality factor is greater than or equal to 8 and the second proportionality factor is less than or equal to 3.

8. The device according to claim 1 wherein the device has radial play, when a shaft of a rotating machine is inserted into said receiving enclosure delimited by said top lining, which radial play is greater than the thickness of the top foil by a first proportionality factor and less than the thickness of the top foil by a second proportionality factor.

9. The device according to claim 8, wherein said first proportionality factor is equal to 0 and said second proportionality factor is less than 2.

10. The device according to claim 1 wherein each longitudinal notch has a longitudinal plane of symmetry.

11. The device according to claim 1 wherein the device comprises a single longitudinal notch, a bump lining formed from a single bump foil, and a top lining formed from a single top foil, so that the radial tongues of the top and bump foils are all freely housed in the same notch.

\* \* \* \* \*